US011475722B2

(12) United States Patent
Edwards et al.

(10) Patent No.: US 11,475,722 B2
(45) Date of Patent: Oct. 18, 2022

(54) AUTONOMOUS VEHICLE POSITIONING FOR SENSOR CALIBRATION

(71) Applicant: GM Cruise Holdings LLC, San Francisco, CA (US)

(72) Inventors: Zachary Edwards, Oakland, CA (US); Matthew Jones, Oakland, CA (US); David Tran, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 163 days.

(21) Appl. No.: 16/933,242

(22) Filed: Jul. 20, 2020

(65) Prior Publication Data

US 2022/0020232 A1 Jan. 20, 2022

(51) Int. Cl.
*B60W 50/00* (2006.01)
*G07C 5/08* (2006.01)
*B60W 50/04* (2006.01)

(52) U.S. Cl.
CPC .......... *G07C 5/0841* (2013.01); *B60W 50/045* (2013.01); *B60W 2050/0063* (2013.01); *B60W 2050/0075* (2013.01); *B60W 2050/046* (2013.01); *B60W 2556/55* (2020.02)

(58) Field of Classification Search
CPC .......... G07C 5/00; G07C 5/08; G07C 5/0841; B60W 50/00; B60W 50/04; B60W 50/045; B60W 2556/00; B60W 2556/45; B60W 2556/55; B60W 2050/0062; B60W 2050/0063; B60W 2050/0075; B60W 2050/046
See application file for complete search history.

(56) References Cited

U.S. PATENT DOCUMENTS

| | | | | |
|---|---|---|---|---|
| 2004/0149520 | A1* | 8/2004 | Taylor | B66F 7/20 187/203 |
| 2005/0076495 | A1* | 4/2005 | Kelley | B23Q 3/18 29/721 |
| 2015/0134191 | A1* | 5/2015 | Kim | G01M 17/007 701/29.7 |
| 2016/0161602 | A1* | 6/2016 | Prokhorov | G01S 7/4972 702/97 |
| 2018/0134529 | A1* | 5/2018 | Zecher | G01B 11/275 |
| 2019/0204427 | A1* | 7/2019 | Abari | G01S 7/497 |
| 2019/0331482 | A1* | 10/2019 | Lawrence | G01S 7/4086 |
| 2020/0130188 | A1* | 4/2020 | Lawrence | G01S 7/4972 |

* cited by examiner

Primary Examiner — Tyler J Lee
Assistant Examiner — Tiffany P Ohman
(74) Attorney, Agent, or Firm — Polsinelli, PC

(57) ABSTRACT

The subject disclosure relates to techniques for positioning an autonomous vehicle for sensor calibration. A process of the disclosed technology can include steps for positioning an autonomous vehicle along a first axis on a platform in a predetermined environment using guide rails, positioning the autonomous vehicle along a second axis on the platform using one or more elevated platform features, inserting one or more lifting alignment pins of a lifting mechanism into one or more sockets located on an underbody of the autonomous vehicle, and positioning the autonomous vehicle along a third axis using the lifting mechanism. Systems and machine-readable media are also provided.

18 Claims, 7 Drawing Sheets

US 11,475,722 B2

AUTONOMOUS VEHICLE POSITIONING FOR SENSOR CALIBRATION

BACKGROUND

1. Technical Field

The subject disclosure provides solutions for positioning an autonomous vehicle in a predetermined environment for calibration and in particular, for using guide rails, elevated platform features, a lifting mechanism, lifting alignment pins, and sockets to precisely and/or accurately position the autonomous vehicle.

2. Introduction

Autonomous vehicles heavily utilize many sensors to navigate. If sensors are not properly calibrated, autonomous vehicles may not detect and/or incorrectly detect object locations, which may create dangerous situations. Thus, calibration for these sensors are important for safe operation of autonomous vehicles.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1A:
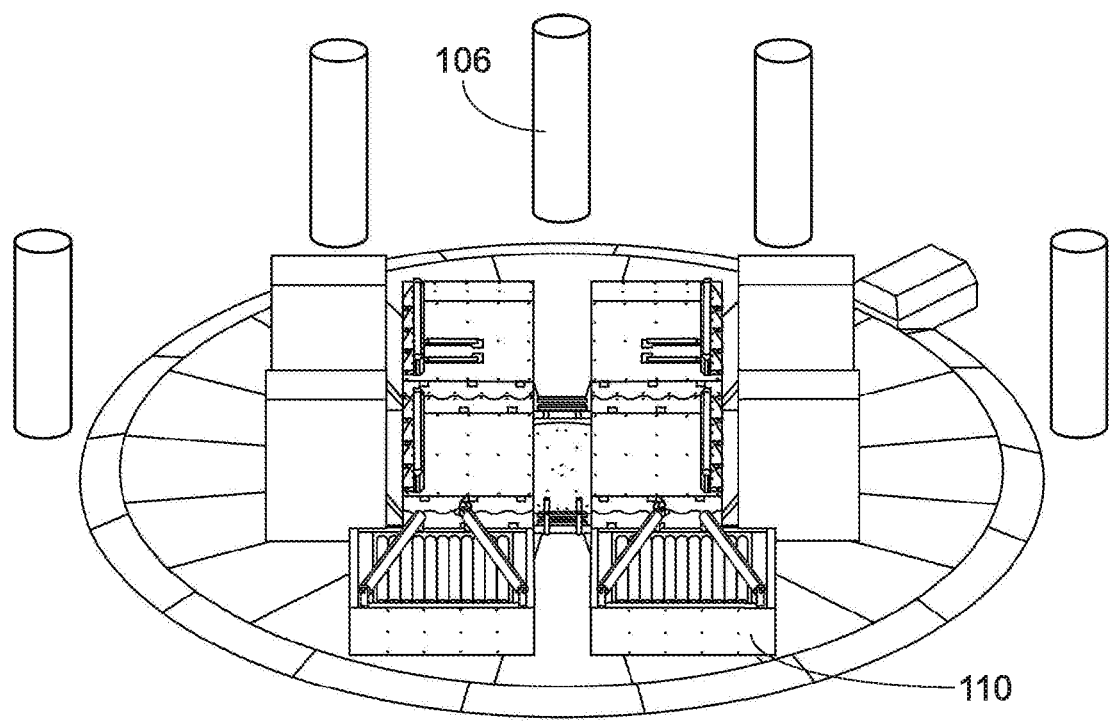
FIGS. 1A-1B illustrate an example environment before and after an autonomous vehicle is in a calibration position, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs) utilize multiple sensors to perform perception, navigation, and routing functions. If sensors are not properly calibrated, autonomous vehicles may not detect and/or incorrectly detect object locations, which may create dangerous situations. Thus, calibration for these sensors are important for safe operation AVs. Although there are various methods for calibrating sensors of autonomous vehicles, these methods do not consider the position of the autonomous vehicle relative to the surrounding environment, which can result in inaccurate and/or imprecise calibrations. These inaccurate and/or imprecise calibrations must then be re-calibrated, wasting time and increasing costs for operations. These problems are further exacerbated as the number of autonomous vehicles increase. Thus, there is a need to control the position of the autonomous vehicle relative to the environment the autonomous vehicle is in during calibration.

Aspects of the disclosed technology address the limitations of conventional calibration techniques. More specifically, aspects of the disclosed technology position the autonomous vehicle along a first axis and a second axis. Then, the position of the autonomous vehicle is finalized by lifting alignment pins mating with sockets disposed on an underbody of the autonomous vehicle. Then, the sensors of the autonomous vehicle are calibrated based on positions of the autonomous vehicle and objects in the environment. With more specificity, an autonomous vehicle may be positioned along a first axis using guide rails and/or a rolling mechanism. Additionally, the autonomous vehicle may be positioned along a second axis orthogonal to the first axis using elevated platform features. Furthermore, the autonomous vehicle may be positioned along a third axis orthogonal to the first axis and the second axis by using a lifting mechanism. When the autonomous vehicle is positioned along all three axes, sensors of the autonomous vehicle can be calibrated based on the calibrated position of the autonomous vehicle and positions of objects in the surrounding environment.

Figure 1B:
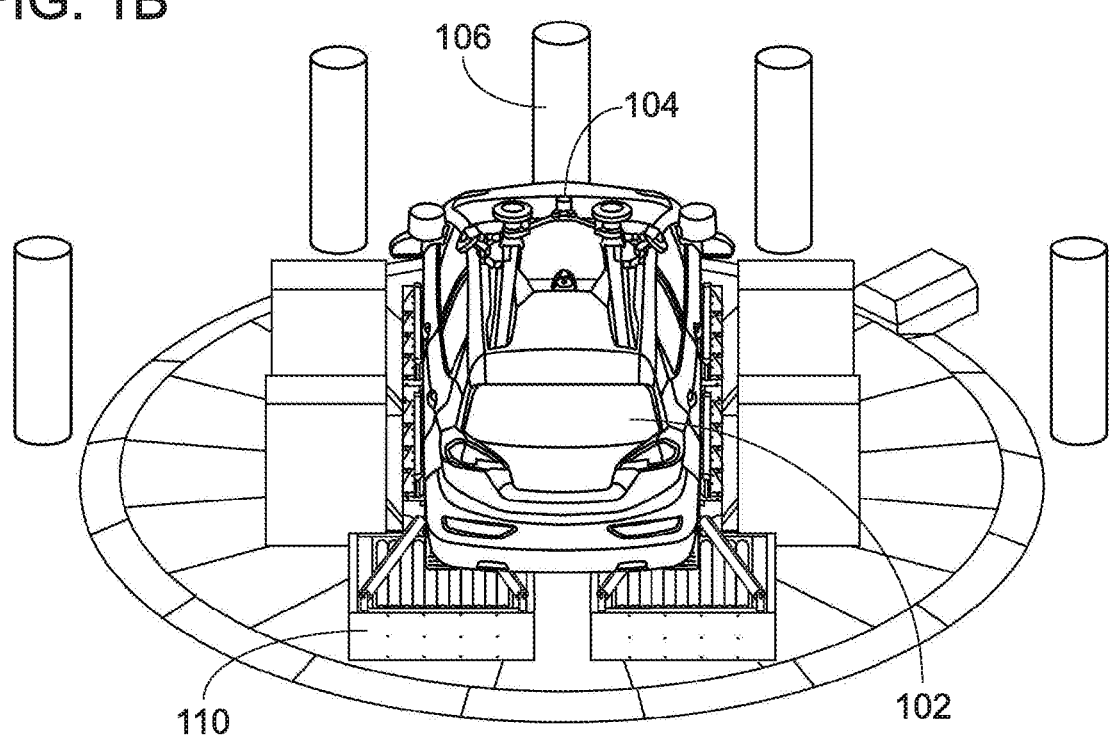

FIGS. 1A-1B illustrate an environment 100 for calibrating an autonomous vehicle 102. More specifically, environment 100 may be a predetermined environment 100 having objects 106 and a platform 110. A predetermined environment 100 includes objects 106 and platform 110 in predetermined locations of the predetermined environment. Similarly, objects 106 and/or platform 110 may be first positioned in the predetermined environment 100 and distances and directions between objects 106 and platform 110 can be calculated to determine predetermined environment 100. Autonomous vehicle 102 may be informed of a location of object 106 and one or more sensors 104 of the autonomous vehicle 102 may detect and confirm detection of object 106 at the location.

Object 106 may be any physical object including, but not limited to, a pillar, statue, desk, sign, etc. In other words, object 106 may be any physical object of any shape or size. Object 106 may be specifically positioned in the location in the predetermined environment 100. In some implementations, object 106 may first be positioned and the location is determined thereafter.

As will be discussed further below, autonomous vehicle 102 may be positioned onto a calibration position on platform 110. Platform 110, as will be discussed further below, has various elements to facilitate precise and accurate positioning of autonomous vehicle 102 into the calibration position.

Figure 2:
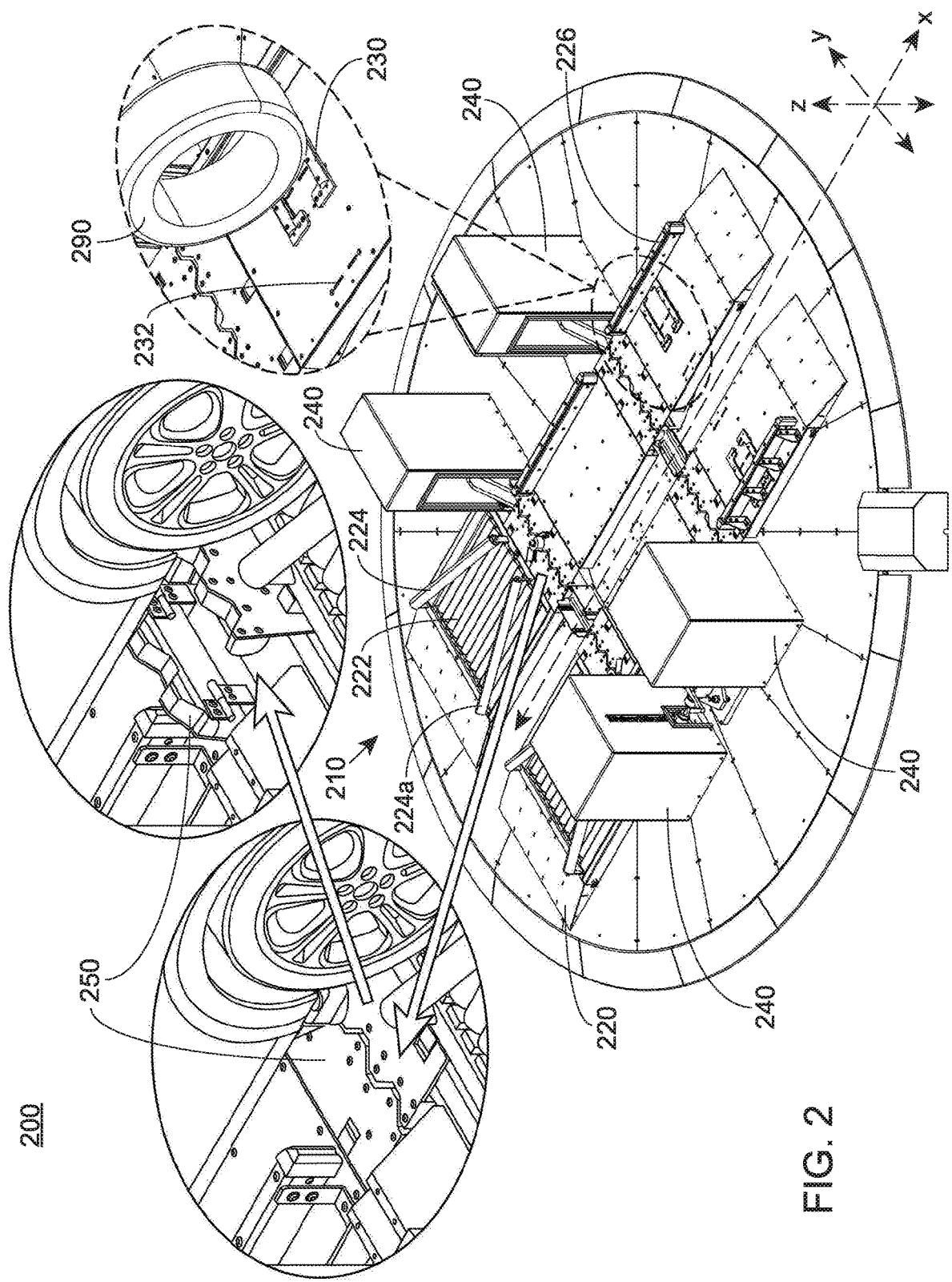
FIG. 2 illustrates an example platform for positioning an autonomous vehicle in a calibration position, according to some aspects of the disclosed technology.

FIG. 2 illustrates an upper perspective view of a predetermined environment 200 having platform 210, such as platform 110 discussed with respect to FIG. 1. Platform 210 includes one or more ramps 220, a rolling mechanism 222, guide rails 224, one or more barriers 226, elevated platform features 230, one or more lifting mechanisms 240, and a plurality of plates 250.

Ramps 220 provide an ingress area for autonomous vehicle 102 to load onto platform 210. Ramps 220 may further be configured with rolling mechanism 222 and/or guide rails 224 to facilitate positioning autonomous vehicle 102 along a first axis y defined along a width of platform 210 and/or autonomous vehicle 102.

Rolling mechanism 222 may have one or more cylindrical beams configured to allow movement of autonomous vehicle 102 along first axis y as autonomous vehicle 102 traverses thereon. It is further considered that any object with a circular cross-section may be used in place of the cylindrical beams to allow movement of autonomous vehicle 102 along first axis y. In some implementations, the cylindrical beams may be controlled by a processor to detect a weight of autonomous vehicle 102 and position autonomous vehicle 102 into a calibration position along first axis y. In other words, the cylindrical beams may roll to move autonomous vehicle 102 along first axis y thereon.

Guide rails 224 facilitates positioning of autonomous vehicle along first axis y. The guide rails may be inwardly facing with respect to platform 210, such that as autonomous vehicle 102 drives onto platform 210, autonomous vehicle 102 is guided into the calibration position along first axis y. Moreover, some guide rails 224 may be outwardly facing with respect to platform 210, as depicted by inner guide rails 224a. By using a combination of inwardly and outwardly facing guide rails 224, platform 210 can accommodate various different models of autonomous vehicles 102.

It is to be understood that rolling mechanism 222 and guide rails 224 alone or in combination together position autonomous vehicle 102 along first axis y. For example, rolling mechanism 222 may provide a rough position along first axis y, during and/or after which guide rails 224 may provide a more accurate position along first axis y.

Barriers 226 facilitates maintaining the calibration position of autonomous vehicle 102 along first axis y. More specifically, when autonomous vehicle 102 is in the calibration along first axis y, barriers 226 provide structural support to prevent autonomous vehicle 102 from deviating from first axis y.

Elevated platform features 230 position autonomous vehicle 102 along a second axis x defined along a length of platform 210 and/or across autonomous vehicle 102. In other words, first axis y is orthogonal to second axis x. More specifically, one or more elevated platform features 230 provide a calibration position along second axis x by identifying a position where one or more tires 290 are in contact with elevated platform features 230. In other words, elevated platform features 230 identify when autonomous vehicle 102 should stop moving forward. In some implementations, multiple elevated platform features 230 may cradle each tire 290 of autonomous vehicle 102, such that one or more elevated platform features 230 is position in front of and in contact with tire 290 and one or more elevated platform features is behind and in contact with tire 290.

Elevated platform features may be attached to slots 232. Slots 232 allow configuring a location of elevated platform features 230. Thus, having more slots 232 allow for additional configurations and locations of elevated platform features 230, which may allow for compatibility with additional autonomous vehicle models. Additionally, guide rails 224 and barriers 226 may be configured to attach to slots 232 and similarly utilize different slots and combinations thereof to improve configurations and locations of guide rails 224 and barriers 226 to adapt to additional autonomous vehicle models.

Lifting mechanisms 240 position autonomous vehicle 102 along a third axis z defined along a height of platform 210 and/or autonomous vehicle 102. In other words, third axis z is orthogonal to both first axis y and second axis x.

Plates 250 are configured to have an open and a closed position. FIG. 2 illustrates plates 250 in the closed position. When plates 250 are in the closed position, plates 250 allow autonomous vehicle 102 to traverse thereover. As will be discussed further below, plates 250 cover lifting alignment pins and horizontal beams when plates 250 are in the closed position. Thus, plates 250 prevent lifting alignment pins and horizontal beams from hindering movement of autonomous vehicle 102 thereon when plates 250 are in the closed position.

Figure 3:
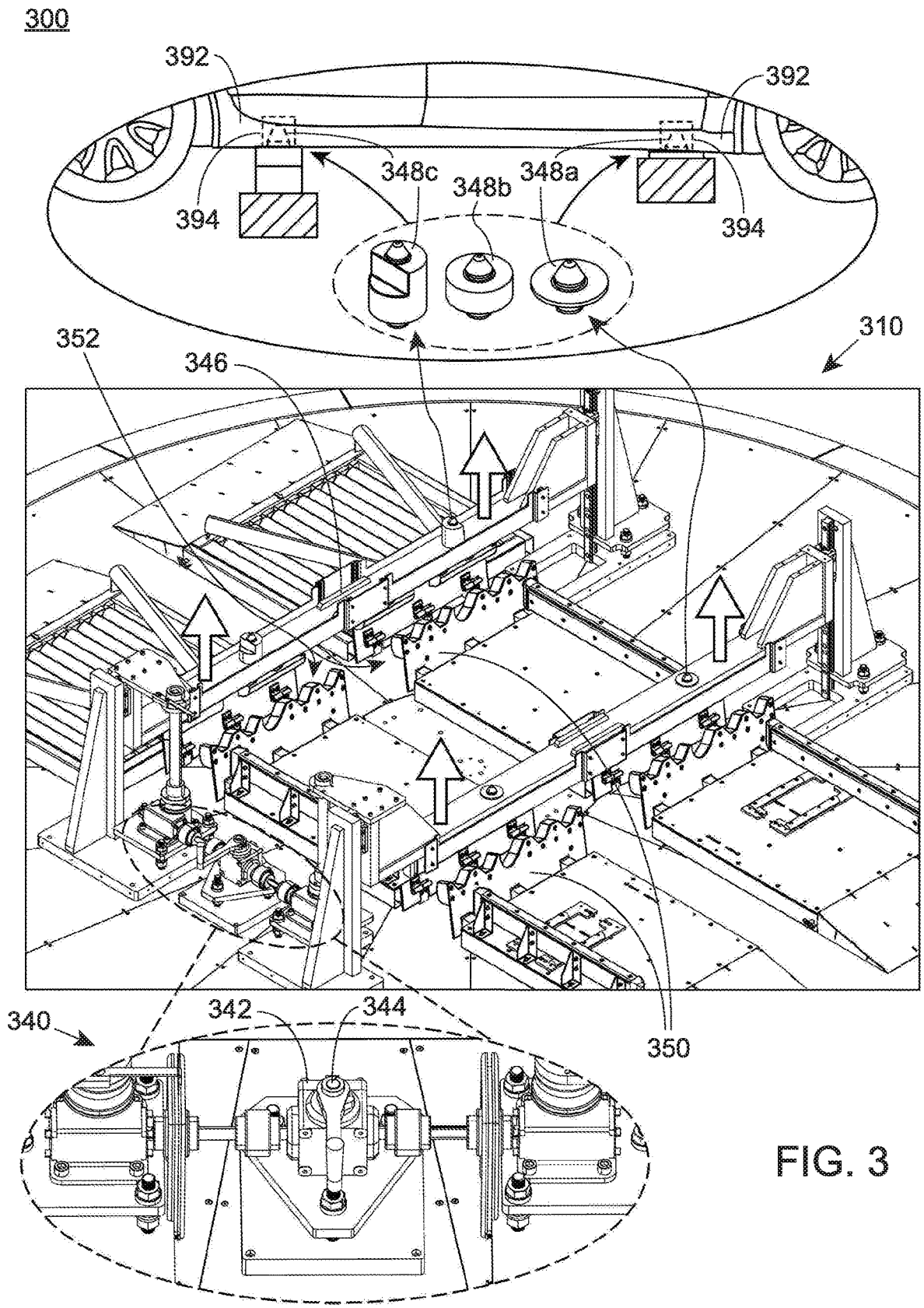
FIG. 3 illustrates an example platform for positioning an autonomous vehicle in a calibration position, according to some aspects of the disclosed technology.

FIG. 3 illustrates a top view of a predetermined environment 300 having a platform 310, such as platform 110 discussed with respect to FIG. 1 and/or platform 210 discussed with respect to FIG. 2. Platform 310 includes a lifting mechanism 340 and a plurality of plates 350 illustrated in an open position to define openings 352.

Lifting mechanism 340, like lifting mechanism 240 discussed above with respect to FIG. 2, positions autonomous vehicle along a third axis. Lifting mechanism 340 may have a motor 342, a controller 344, cross-car beams 346, and lifting alignment pins 348.

Motor 342 is configured to lift cross-car beams 346 and accordingly autonomous vehicle 102. In some embodiments, the motor is controlled by a variable frequency drive to power lifting mechanism 240. In some embodiments, the motor is a servo drive system that provides additional precision and lifting data for various parameters including, but not limited to, acceleration, deceleration, velocity, force feedback, roll, pitch, etc.

Controller 344 is configured to actuate motor 342. In some embodiments, the controller 344 provides a single point of control for cross-car beams 346. More specifically, controller 344 actuates motor 342, which may be in communication with a miter gearbox controlling lifting jacks. In some embodiments, the miter gearbox simultaneously controls two or more lifting jacks, which lift cross-car beams 346. Accordingly, lifting mechanism 340 can lift a front and a rear portion of autonomous vehicle 102 simultaneously. It is contemplated that controller 344 may additionally be controlled by an industrial computer, such as a programmable logic controller (PLC) to automate lifting cross-car beams 346. In some embodiments, controller 344 may be a handle, as shown in FIG. 3.

Cross-car beams 346 are structural beams configured to support the weight of and lift autonomous vehicle 102. Cross-car beams 346 are attached to lifting jacks of lifting mechanism 340. Furthermore, cross-car beams 346 provide a structural mount for lifting alignment pins 348. It is further contemplated that, in some embodiments, cross-car beams 346 may instead be lifting arms attached to respective lifting jacks of lifting mechanism 340. For example, four lifting arms may be attached to four respective lifting jacks. Furthermore, the lifting arms may also provide a structural mount for lifting alignment pins 348.

Lifting alignment pins 348 are configured to insert into and be received by sockets 394 disposed on an underbody 392 of autonomous vehicle 102. For example, sockets 394 may be body datum features made during manufacturing of autonomous vehicle 102. A variety of different lifting alignment pins 348a, 348b, 348c (collectively lifting alignment pins 348) may be utilized. Lifting alignment pin 348a is a lifting alignment pin that can be used for a front socket 394 of autonomous vehicle 102. Lifting alignment pin 348b is a general lifting alignment pin that can be used for a front and/or a rear socket 394 of autonomous vehicle 102. Lifting alignment pin 348c is a lifting alignment pin that can be used for a rear socket 394 of autonomous vehicle 102. Furthermore, lifting alignment pins 348 may have a conical tip. The conical tip allows lifting alignment pins 348 to insert into sockets 394. Moreover, when autonomous vehicle 102 is positioned within a range of accuracy with respect to the conical tip, the conical tip can allow lifting alignment pin 348 to fit into socket 394 by first fitting into the socket and, as lifting alignment pin 348 enters socket 394, move autonomous vehicle 102, so that a remainder of lifting alignment pin 348 can also fit into socket 394. Thus, lifting alignment pin 348 also finalizes the calibration position of autonomous vehicle along first axis y and second axis x.

Plates 350, like plates 250 discussed above with respect to FIG. 2, are configured to have an open and a closed position. FIG. 3 illustrates plates 350 in an open position. In the open position, plates 350 define openings 352, through which reveal cross-car beams 346 and lifting alignment pins 348 are accessible. In other words, when plates 350 are in the open position, cross-car beams 346 and lifting alignment pins 348 can be lifted by lifting jacks controlled by motor 342 and controller 344. In some embodiments, plates 350 can utilize gravity assisted guides to keep the plates 350 positionally located out of the way in the open position and also allow the plates 350 to return to the closed position when cross-car beams 346 and lifting alignment pins 348 are stowed.

Figure 4:
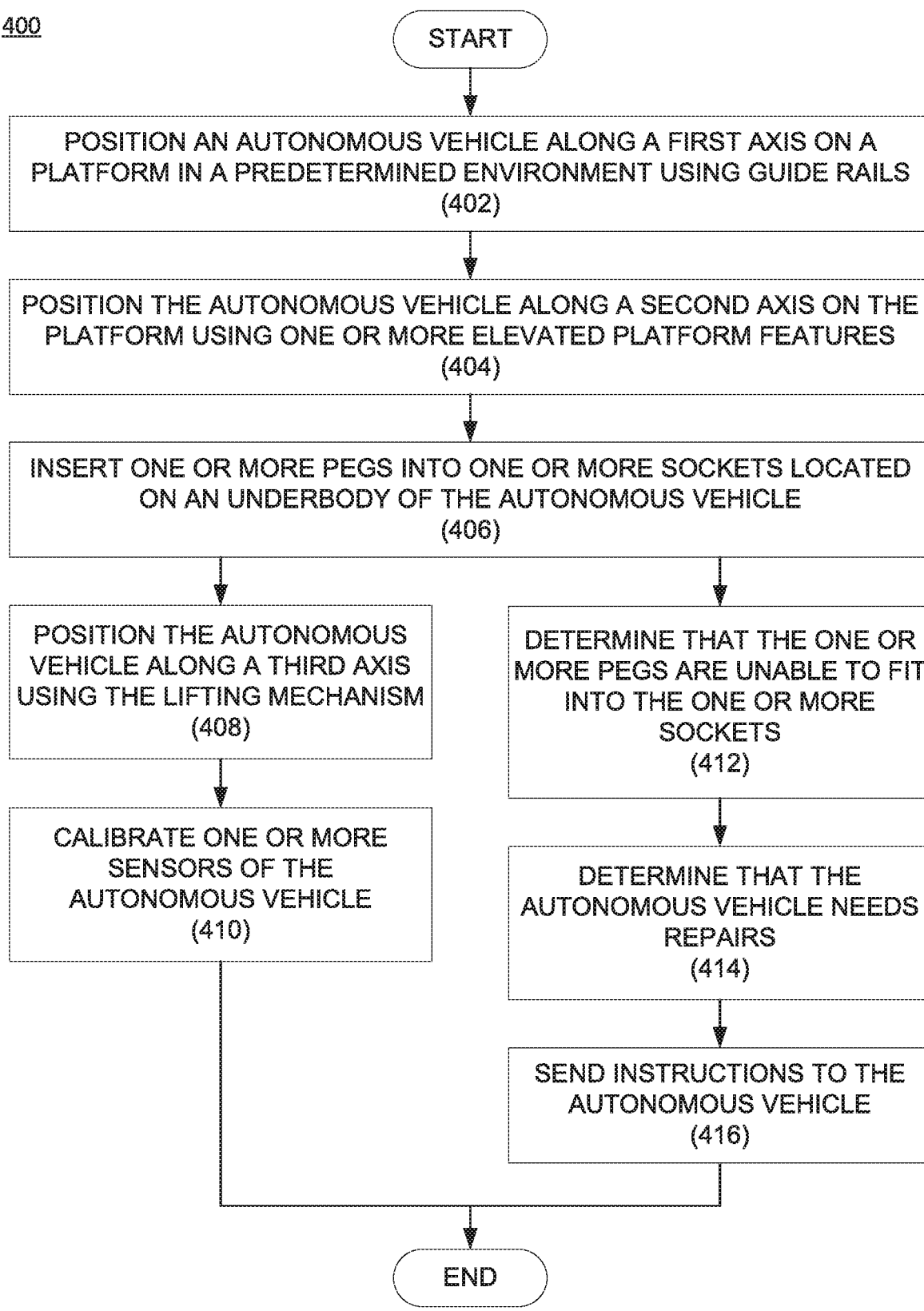
FIG. 4 illustrates an example method for positioning and calibrating an autonomous vehicle, according to some aspects of the disclosed technology.

FIG. 4 illustrates an example method 400 for positioning and calibrating an autonomous vehicle 102. Method 400 begins at step 402, in which autonomous vehicle 102 is positioned along a first axis on a platform in a predetermined environment using guide rails. Moreover, the guide rails are inwardly facing with respect to the platform. In some implementations, a rolling mechanism may also be used to facilitate positioning the autonomous vehicle along the first axis.

At step 404, the autonomous vehicle is positioned along a second axis on the platform using one or more elevated platform features. Furthermore, the second axis is orthogonal to the first axis.

At step 406, one or more lifting alignment pins are inserted into one or more sockets located on an underbody of the autonomous vehicle. In some embodiments, insertion of the one or more lifting alignment pins of the lifting mechanism into the one or more sockets located on the underbody of the autonomous vehicle finalizes an accurate and/or precise position of the autonomous vehicle. In some embodiments, the one or more lifting alignment pins of the lifting mechanism are first located under plates or a top surface of the platform when the lifting mechanism is in a receiving and/or stowed state and/or the plates are in a closed position. The plates or top surface may be configured to retract and/or close over the lifting mechanism when the lifting mechanism is in the receiving state and/or the plates are in a closed position. Furthermore, in some embodiments, the one or more sockets of the lifting mechanism may protrude through an opening defined by retractable plates of the platform when the lifting mechanism is in an engaging state and/or the plates are in an open position.

If the one or more lifting alignment pins are properly inserted into the one or more sockets, then method 400 continues to step 408. If the one or more lifting alignment pins are unable to fit into one or more sockets, then method 400 moves to step 412.

At step 408, the autonomous vehicle is positioned along a third axis using a lifting mechanism. The third axis is orthogonal to the first axis and the second axis. In some embodiments, the lifting mechanism comprises a servo motor system that provides lifting data of the autonomous vehicle when the one or more lifting alignment pins are inserted into the one or more sockets. For example, the lifting data may include acceleration, velocity, deceleration, force feedback, roll, pitch, etc. as autonomous vehicle 102 is lifted. In some embodiments, the lifting mechanism further comprises one or more cross-car support beams and the one or more lifting alignment pins are located on the one or more cross-car support beams. In some embodiments, the lifting mechanism further comprises a single lifting control point, such as controller 344. The single lifting control point may be configured to control at least two lifting jacks that are configured to lift a front and rear portion of the autonomous vehicle simultaneously.

At step 410, one or more sensors of the autonomous vehicle are calibrated based on a calibrated position of the autonomous vehicle. In other words, after the autonomous vehicle is in the calibrated position in the predetermined environment, the one or more sensors of the autonomous vehicle can be calibrated using the calibrated position. In some embodiments, the calibration is conducted with steps described below in FIG. 5. After calibrating the one or more sensors, method 400 is complete.

At step 412, the one or more lifting alignment pins are determined to be unable to fit into the one or more sockets. This can occur, for example, when the autonomous vehicle is improperly positioned. When the autonomous vehicle is improperly positioned, personnel may be notified to re-position the autonomous vehicle according to steps of method 400. As another example, the one or more lifting alignment pins may also be unable to fit into the one or more sockets when the autonomous vehicle has body damage and/or is in need of repairs.

At step 414, the autonomous vehicle is determined to need repairs. As discussed above, this may be determined when the autonomous vehicle has body damage and the sockets of the autonomous vehicle cannot properly receive the lifting alignment pins.

At step 416, instructions are sent to the autonomous vehicle. The instructions may be effective to navigate the autonomous vehicle to a repair facility. In some implementations, the predetermined environment may also be a repair facility. In some embodiments, the instructions may be to notify personnel via an equipment alarm system with a warning message to address the need for repairs.

Figure 5:
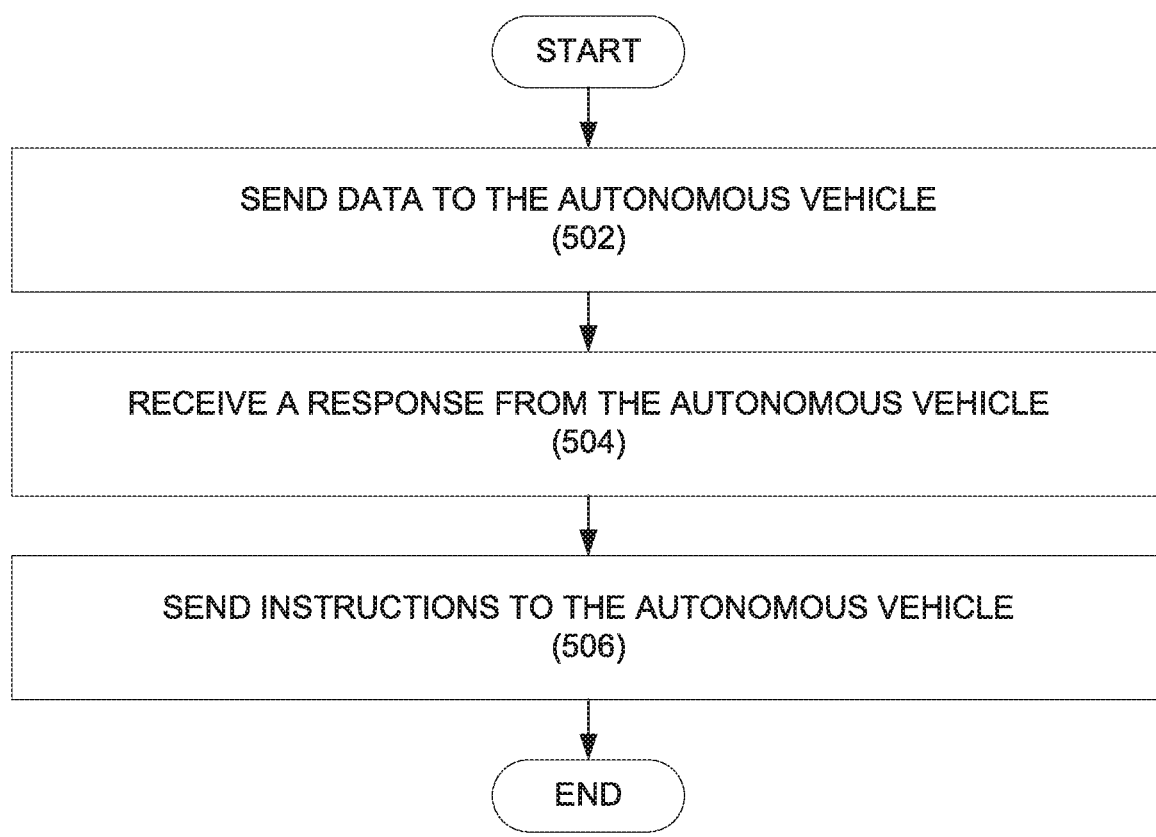
FIG. 5 illustrates an example method for calibrating an autonomous vehicle, according to some aspects of the disclosed technology.

FIG. 5 illustrates an example method 500 for calibrating one or more sensors of an autonomous vehicle. For example, method 500 may be used in step 410 of method 400 as described with respect to FIG. 4. Method 500 begins with step 502, data is sent to the autonomous vehicle. The data indicates a position or location of an object in a predetermined environment that the autonomous vehicle is positioned in. In some embodiments, the data indicates a distance and/or a direction from the autonomous vehicle to the object. In some embodiments, the data can indicate the position, the distance, the direction, or any combination thereof.

At step 504, a response is received from the autonomous vehicle. The response may indicate if the one or more sensors of the autonomous vehicle has detected the object at the position or location in the predetermined as indicated in the data.

At step 506, instructions are sent to the autonomous vehicle. The instructions may be based on if the response received in step 504 has detected the object at the location indicated in the data. For example, if the object is properly detected at the indicated location, then the one or more sensors are calibrated properly. Thus, the instructions may be to initiate ridesharing functions, navigate to a cleaning facility, etc. As another example, if the object is not properly detected at the indicated location, then the one or more sensors are not properly calibrated. Thus, the instructions may be to notify an operator and/or change calibration settings. It is contemplated that additional data with locations of additional objects and/or the object can be sent to autonomous vehicle to test detection of additional objects and/or re-test detection of the object.

It is contemplated that methods 400, 500 can be implemented by one or more processors in communication with one or more memories. Similarly, a non-transitory computer-readable medium can have instructions stored thereon, such that the instructions are effective to cause one or more processors to implement the steps for methods 400, 500.

Figure 6:
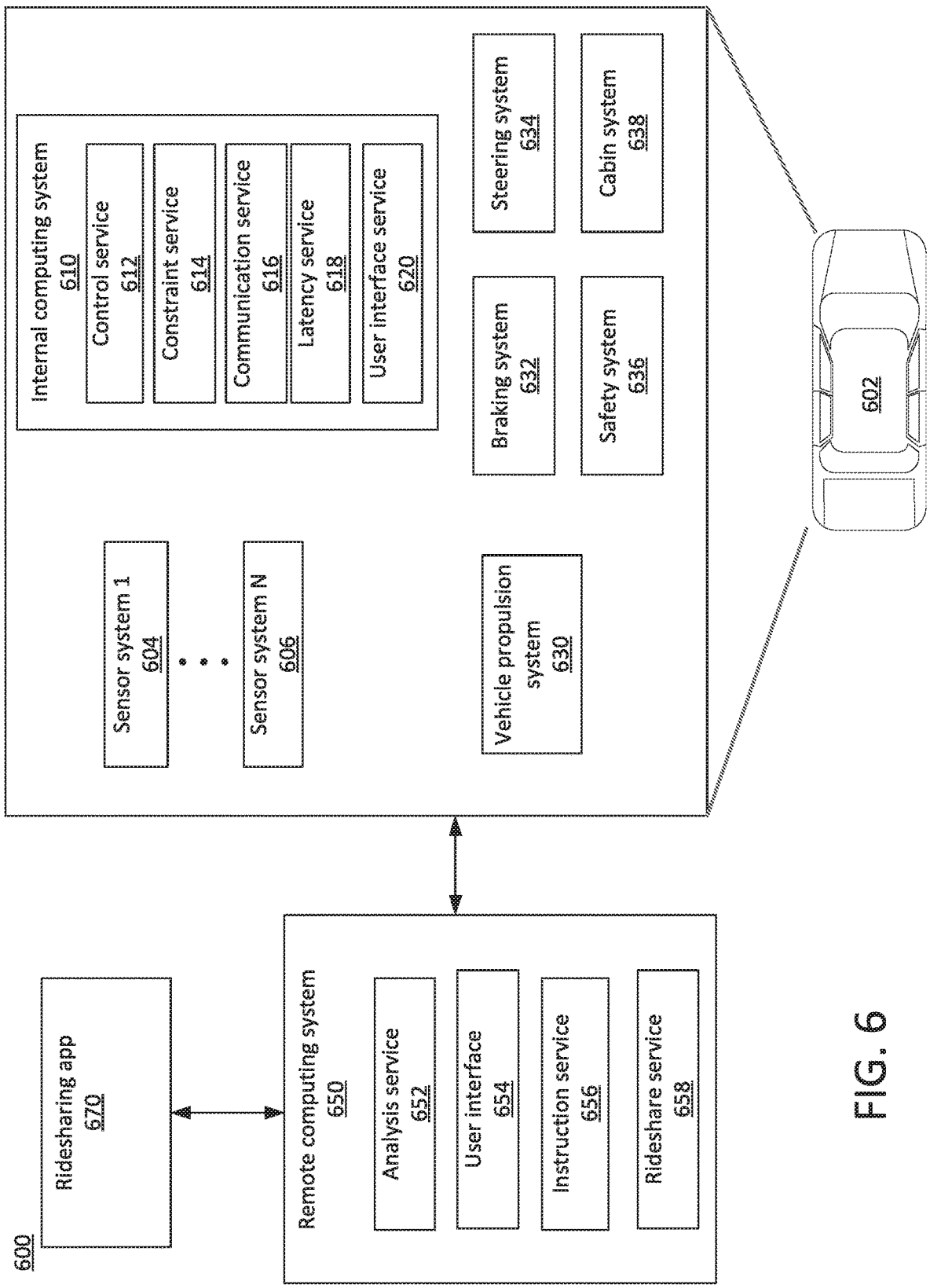
FIG. 6 illustrates an example environment that includes an autonomous vehicle in communication with a remote computing system, according to some aspects of the disclosed technology.

FIG. 6 illustrates environment 600 that includes an autonomous vehicle 602 in communication with a remote computing system 650.

The autonomous vehicle 602 can navigate about roadways without a human driver based upon sensor signals output by sensor systems 604-606 of the autonomous vehicle 602. The autonomous vehicle 602 includes a plurality of sensor systems 604-606 (a first sensor system 604 through an Nth sensor system 606). The sensor systems 604-606 are of different types and are arranged about the autonomous vehicle 602. For example, the first sensor system 604 may be a camera sensor system, and the Nth sensor system 606 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 602 further includes several mechanical systems that are used to effectuate appropriate motion of the autonomous vehicle 602. For instance, the mechanical systems can include but are not limited to, a vehicle propulsion system 630, a braking system 632, and a steering system 634. The vehicle propulsion system 630 may include an electric motor, an internal combustion engine, or both. The braking system 632 can include an engine brake, brake pads, actuators, and/or any other suitable componentry that is configured to assist in decelerating the autonomous vehicle 602. The steering system 634 includes suitable componentry that is configured to control the direction of movement of the autonomous vehicle 602 during navigation.

The autonomous vehicle 602 further includes a safety system 636 that can include various lights and signal indicators, parking brake, airbags, etc. The autonomous vehicle 602 further includes a cabin system 638 that can include cabin temperature control systems, in-cabin entertainment systems, etc.

The autonomous vehicle 602 additionally comprises an internal computing system 610 that is in communication with the sensor systems 604-606 and the systems 630, 632, 634, 636, and 638. The internal computing system includes at least one processor and at least one memory having computer-executable instructions that are executed by the processor. The computer-executable instructions can make up one or more services responsible for controlling the autonomous vehicle 602, communicating with remote computing system 650, receiving inputs from passengers or human co-pilots, logging metrics regarding data collected by sensor systems 604-606 and human co-pilots, etc.

The internal computing system 610 can include a control service 612 that is configured to control the operation of the vehicle propulsion system 630, the braking system 632, the steering system 634, the safety system 636, and the cabin system 638. The control service 612 receives sensor signals from the sensor systems 604-606 as well communicates with other services of the internal computing system 610 to effectuate operation of the autonomous vehicle 602. In some embodiments, control service 612 may carry out operations in concert one or more other systems of autonomous vehicle 602.

The internal computing system 610 can also include a constraint service 614 to facilitate safe propulsion of the autonomous vehicle 602. The constraint service 614 includes instructions for activating a constraint based on a rule-based restriction upon operation of the autonomous vehicle 602. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 612.

The internal computing system 610 can also include a communication service 616. The communication service can include both software and hardware elements for transmitting and receiving signals from/to the remote computing system 650. The communication service 616 is configured to transmit information wirelessly over a network, for example, through an antenna array that provides personal cellular (long-term evolution (LTE), 3G, 5G, etc.) communication.

In some embodiments, one or more services of the internal computing system 610 are configured to send and receive communications to remote computing system 650 for such reasons as reporting data for training and evaluating machine learning algorithms, requesting assistance from remoting computing system or a human operator via remote computing system 650, software service updates, ridesharing pickup and drop off instructions etc.

The internal computing system 610 can also include a latency service 618. The latency service 618 can utilize timestamps on communications to and from the remote computing system 650 to determine if a communication has been received from the remote computing system 650 in time to be useful. For example, when a service of the internal computing system 610 requests feedback from remote computing system 650 on a time-sensitive process, the latency service 618 can determine if a response was timely received from remote computing system 650 as information can quickly become too stale to be actionable. When the latency service 618 determines that a response has not been received within a threshold, the latency service 618 can enable other systems of autonomous vehicle 602 or a passenger to make necessary decisions or to provide the needed feedback.

The internal computing system 610 can also include a user interface service 620 that can communicate with cabin system 638 in order to provide information or receive information to a human co-pilot or human passenger. In some embodiments, a human co-pilot or human passenger may be required to evaluate and override a constraint from constraint service 614, or the human co-pilot or human passenger may wish to provide an instruction to the autonomous vehicle 602 regarding destinations, requested routes, or other requested operations.

As described above, the remote computing system 650 is configured to send/receive a signal from the autonomous vehicle 602 regarding reporting data for training and evaluating machine learning algorithms, requesting assistance from remote computing system 650 or a human operator via the remote computing system 650, software service updates, rideshare pickup and drop off instructions, etc.

The remote computing system 650 includes an analysis service 652 that is configured to receive data from autonomous vehicle 602 and analyze the data to train or evaluate machine learning algorithms for operating the autonomous vehicle 602. The analysis service 652 can also perform analysis pertaining to data associated with one or more errors or constraints reported by autonomous vehicle 602.

The remote computing system 650 can also include a user interface service 654 configured to present metrics, video, pictures, sounds reported from the autonomous vehicle 602 to an operator of remote computing system 650. User interface service 654 can further receive input instructions from an operator that can be sent to the autonomous vehicle 602.

The remote computing system 650 can also include an instruction service 656 for sending instructions regarding the operation of the autonomous vehicle 602. For example, in response to an output of the analysis service 652 or user interface service 654, instructions service 656 can prepare instructions to one or more services of the autonomous vehicle 602 or a co-pilot or passenger of the autonomous vehicle 602.

The remote computing system 650 can also include a rideshare service 658 configured to interact with ridesharing application 670 operating on (potential) passenger computing devices. The rideshare service 658 can receive requests to be picked up or dropped off from passenger ridesharing app 670 and can dispatch autonomous vehicle 602 for the trip. The rideshare service 658 can also act as an intermediary between the ridesharing app 670 and the autonomous vehicle wherein a passenger might provide instructions to the autonomous vehicle 602 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 7:
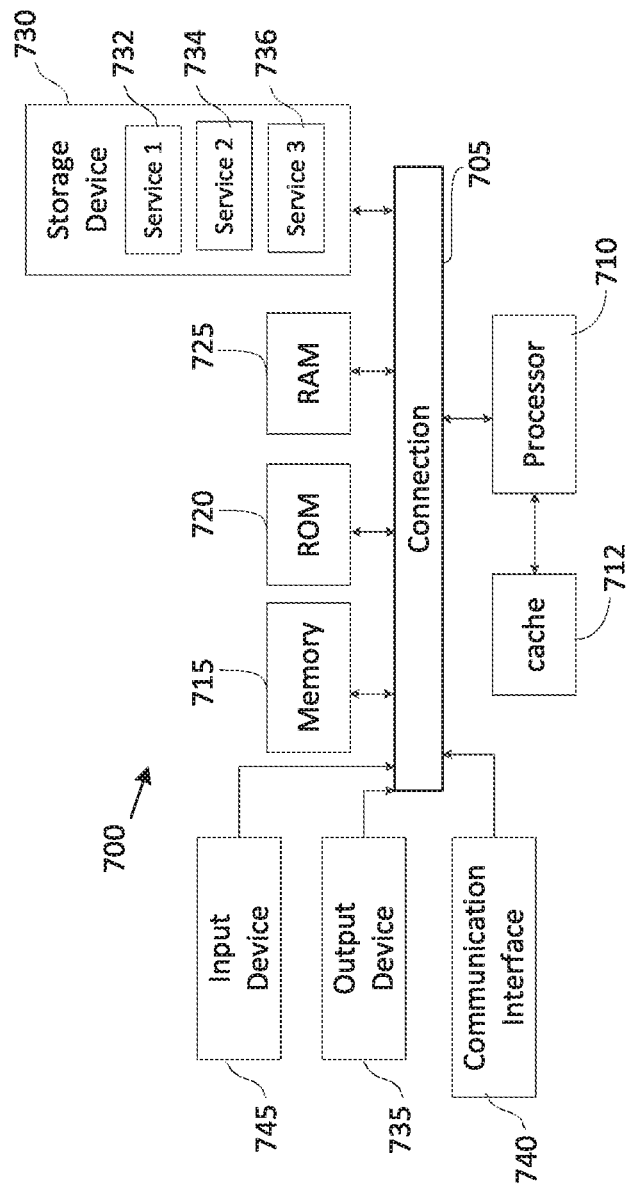
FIG. 7 illustrates an example processor-based system with which some aspects of the subject technology can be implemented.

FIG. 7 shows an example of computing system 700, which can be for example any computing device making up internal computing system 610, remote computing system 650, (potential) passenger device executing rideshare app 670, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A method comprising:
   positioning an autonomous vehicle along a first axis on a platform in a predetermined environment using guide rails;
   positioning the autonomous vehicle along a second axis on the platform using one or more elevated platform features, wherein the second axis is orthogonal to the first axis;
   inserting one or more lifting alignment pins of a lifting mechanism into one or more sockets located on an underbody of the autonomous vehicle; and
   positioning the autonomous vehicle along a third axis using the lifting mechanism, the third axis orthogonal to the first axis and the second axis,
   wherein the lifting mechanism further comprises one or more cross-car support beams, and wherein the one or more lifting alignment pins are located on the one or more cross-car support beams.

2. The method of claim 1, further comprising:
   calibrating one or more sensors of the autonomous vehicle based on a position of the autonomous vehicle in the predetermined environment.

3. The method of claim 1, further comprising:
   calibrating one or more sensors of the autonomous vehicle with steps comprising:
     sending data to the autonomous vehicle, the data indicating that an object is present at a location in the predetermined environment;
     receiving a response from the autonomous vehicle, the response indicating if the one or more sensors of the autonomous vehicle have detected the object at the location in the predetermined environment; and
     sending instructions to the autonomous vehicle, the instructions based on if the response indicates that the one or more sensors of the autonomous vehicle have detected the object at the location in the predetermined environment.

4. The method of claim 1, wherein the insertion of the one or more lifting alignment pins of the lifting mechanism into the one or more sockets located on the underbody of the autonomous vehicle finalizes a precise position of the autonomous vehicle.

5. The method of claim 1, wherein the one or more lifting alignment pins of the lifting mechanism are located under a top surface of the platform when the lifting mechanism is in a receiving state, the top surface configured to retract over the lifting mechanism when the lifting mechanism is in the receiving state.

6. The method of claim 1, wherein the one or more lifting alignment pins of the lifting mechanism protrude through an opening defined by retractable plates of the platform when the lifting mechanism is in an engaging state.

7. The method of claim 1, further comprising:
   determining that the one or more lifting alignment pins are unable to fit into the one or more sockets;
   in response to determining that the one or more lifting alignment pins are unable to fit into the one or more sockets, determining that the autonomous vehicle needs repairs; and
   in response to determining that the autonomous vehicle needs repairs, sending instructions to the autonomous vehicle, the instructions effective to navigate the autonomous vehicle to a repair facility.

8. The method of claim 1, wherein the lifting mechanism comprises a servo motor system, the servo motor system providing lifting data of the autonomous vehicle when the one or more lifting alignment pins are inserted into the one or more sockets.

9. The method of claim 1, wherein the lifting mechanism further comprises a single lifting control point, wherein the single lifting control point controls at least two lifting jacks that are configured to lift a front and rear portion of the autonomous vehicle simultaneously.

10. A system comprising:
a predetermined environment having a platform;
the platform comprising one or more guide rails, wherein the guide rails are configured to facilitate positioning of an autonomous vehicle along a first axis of the platform;
one or more elevated platform features disposed on a surface of the platform, wherein the one or more elevated platform features are configured to facilitate positioning of the autonomous vehicle along a second axis on the platform, wherein the second axis is orthogonal to the first axis;
a lifting mechanism coupled to the platform, wherein the lifting mechanism is configured to facilitate positioning of the autonomous vehicle along a third axis respective to the platform, wherein the third axis is orthogonal to the first axis and the second axis; and
one or more lifting alignment pins coupled to the lifting mechanism, the one or more lifting alignment pins configured to insert into one or more sockets located on an underbody of the autonomous vehicle, wherein the one or more lifting alignment pins of the lifting mechanism protrude through an opening defined by retractable plates of the platform when the lifting mechanism is in an engaging state.

11. The system of claim 10, wherein one or more sensors of the autonomous vehicle are calibrated based on a position of the autonomous vehicle in the predetermined environment.

12. The system of claim 10, wherein one or more sensors of the autonomous vehicle are calibrated with steps comprising:
sending data to the autonomous vehicle, the data indicating that an object is present at a location in the predetermined environment;
receiving a response from the autonomous vehicle, the response indicating if the one or more sensors of the autonomous vehicle have detected the object at the location in the predetermined environment; and
sending instructions to the autonomous vehicle, the instructions based on if the response indicates that the one or more sensors of the autonomous vehicle have detected the object at the location in the predetermined environment.

13. The system of claim 10, wherein a precise position of the autonomous vehicle is finalized when the one or more lifting alignment pins are inserted into the one or more sockets.

14. The system of claim 10, wherein the one or more lifting alignment pins of the lifting mechanism are located under a top surface of the platform when the lifting mechanism is in a receiving state, the top surface configured to retract over the lifting mechanism when the lifting mechanism is in the receiving state.

15. The system of claim 10, wherein the lifting mechanism comprises a servo motor system, the servo motor system providing lifting data of the autonomous vehicle when the one or more lifting alignment pins are inserted into the one or more sockets.

16. The system of claim 10, wherein the lifting mechanism further comprises one or more cross-car support beams, and wherein the one or more lifting alignment pins are located on the one or more cross-car support beams.

17. The system of claim 10, wherein the lifting mechanism further comprises a single lifting control point, wherein the single lifting control point controls at least two lifting jacks that are configured to lift a front and rear portion of the autonomous vehicle simultaneously.

18. A non-transitory computer-readable medium comprising instructions thereon, the instructions effective to cause one or more processors to:
position an autonomous vehicle along a first axis on a platform in a predetermined environment using guide rails;
position the autonomous vehicle along a second axis on the platform using one or more elevated platform features, wherein the second axis is orthogonal to the first axis;
insert one or more lifting alignment pins of a lifting mechanism into one or more sockets located on an underbody of the autonomous vehicle; and
position the autonomous vehicle along a third axis using the lifting mechanism, the third axis orthogonal to the first axis and the second axis,
wherein the one or more lifting alignment pins of the lifting mechanism are located under a top surface of the platform when the lifting mechanism is in a receiving state, the top surface configured to retract over the lifting mechanism when the lifting mechanism is in the receiving state.

* * * * *